Feb. 14, 1961  E. C. DUDLEY  2,971,523
PUMP AND VALVE ASSEMBLY
Filed Jan. 11, 1957  2 Sheets-Sheet 1

Inventor
EDWARD C. DUDLEY
By Hill, Sherman, Meroni, Gross & Simpson Attys

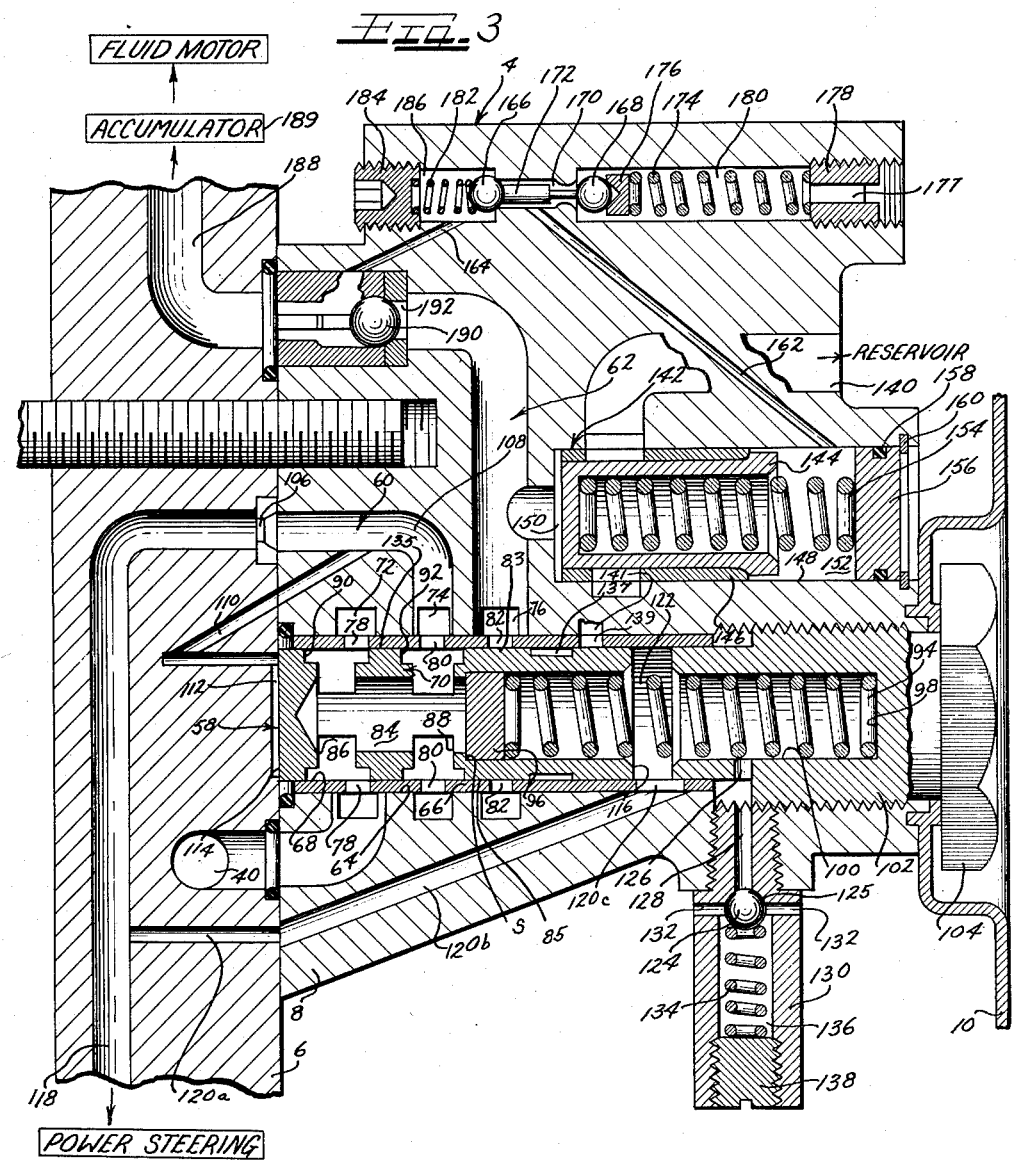

United States Patent Office 2,971,523
Patented Feb. 14, 1961

2,971,523

PUMP AND VALVE ASSEMBLY

Edward C. Dudley, Euclid, Ohio, assignor to Thompson Ramo Wooldridge, Inc., a corporation of Ohio Filed Jan. 11, 1957, Ser. No. 633,653

10 Claims. (Cl. 137—108)

The present invention relates to a hydraulic system such as a hydraulic system embodying power assisting devices in an automotive vehicle and more particularly to a combined pump and valve assembly for supplying pressurized fluid to a hydraulic system embodying a first device such as a power steering pump preferably utilizing an open center type of control and including other devices and accessories preferably utilizing a closed center type of control with an accumulator which must be replenished to insure a minimum pressure head in the hydraulic system.

It is, therefore, an object of the invention to provide an improved pump and valve assembly to provide continuing supply of fluid from a single source and distributing the fluid through a hydraulic system servicing different types of power assist accessories.

Another object of the invention is to provide an improved fluid distribution system for furnishing pressurized fluid to an accumulator wherein the maximum pressure is controlled and an improved fluid escape arrangement is used, which obviates the danger of excessive pressures, but which will not permit the escape of accumulated fluid when an excessive delivery pressure is reached.

Another object of the invention is to provide an improved method of fluid flow control for simultaneously supplying fluid from a single source to a device having an open center control and to a device having a closed center control with an accumulator wherein each can operate at different pressures without affecting the amount of flow to the other.

Other objects and advantages will become more apparent in the complete disclosure of the preferred embodiment of the invention in the specification, claims and drawings in which:

Figure 3 is an enlarged horizontal sectional view taken through the valve of Figure 1 and showing the details of the control system.

While the apparatus illustrating the preferred embodiment of the present invention is shown and described as used in connection with particular mechanism, it will be understood that the features of the invention may be employed in other surroundings utilizing their objectives and advantages. In the present preferred embodiment the mechanism is disclosed in a central hydraulic system for all of the hydraulic power assisting devices or accessories of an automotive vehicle. The distributing or hydraulic system receives the flow of pressurized fluid from the pump and divides it between a first and a second conduit. The first conduit services devices or accessories preferably operable on a so-called open center system wherein continuous flow occurs through the system regardless of the demand at the point of utilization. The power steering mechanism of an automotive vehicle is the type of power assisting accessory which preferably utilizes the open center type of control. The second conduit services devices or accessories preferably operable on a so-called closed center system including a closed center type of accessory such as a fluid motor and an accumulator (as labeled in Figure 3), wherein a supply of pressurized fluid is contained in order that the fluid may be intermittently utilized.

Figure 1:
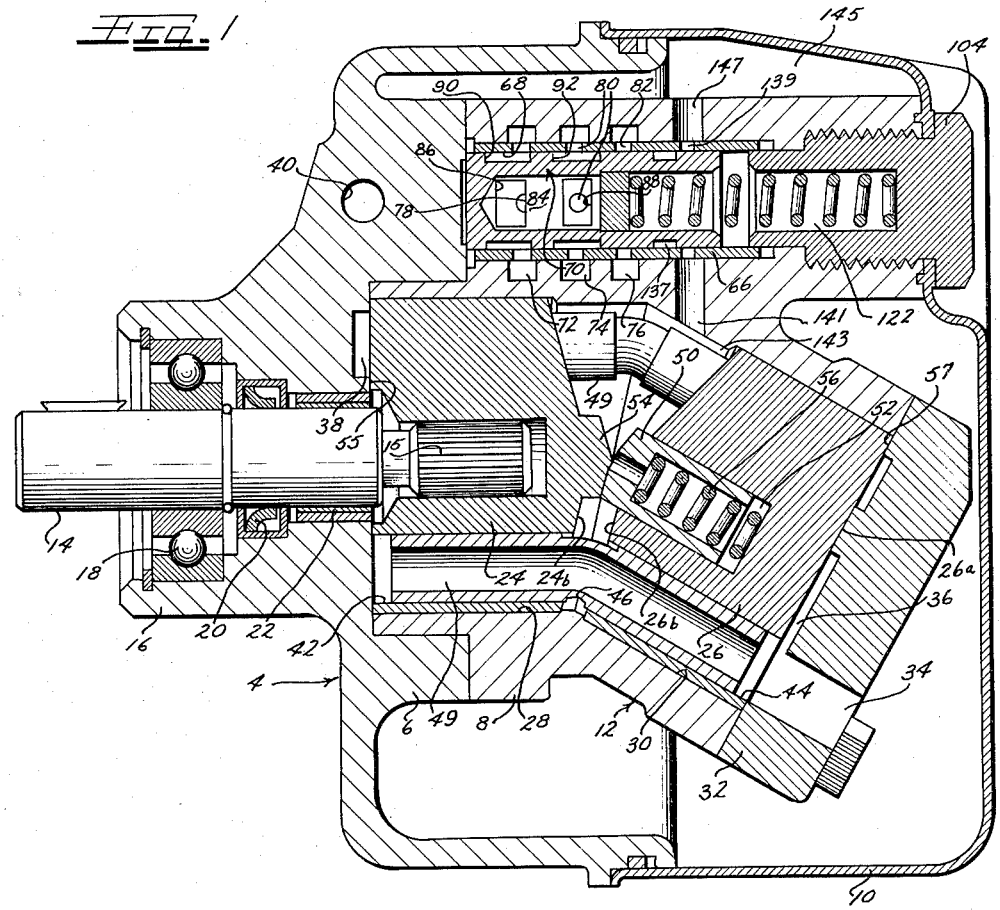
Figure 1 is a vertical sectional view taken through the system and illustrating a pump and control valve embodying the features of the present invention.
Figure 2:
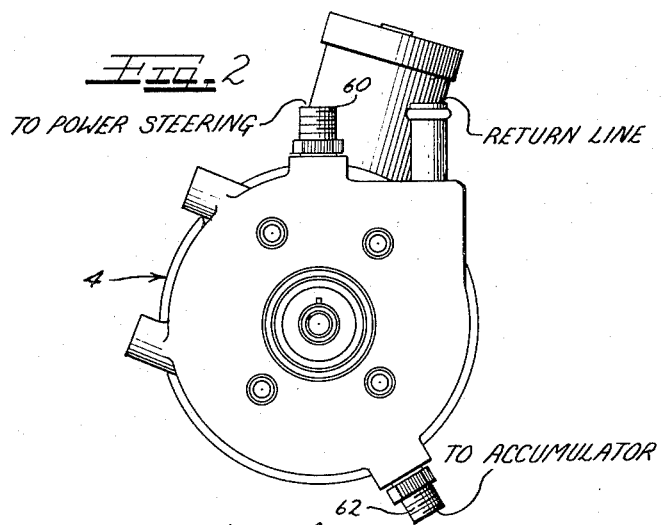
Figure 2 is an end view of the pump and valve housing containing the operating mechanism.

In Figures 1, 2 and 3, the combined pump and valve of the present invention is shown generally at 4, the pump being indicated specifically at 12. A plurality of casing parts are suitably assembled with the first part being shown at 6, the second part or pump housing being shown at 8 and a generally cup-shaped shell or cap telescopically fitting over the first part being shown at 10 and forming together with the first part 6 a reservoir 145 which surrounds the pump housing 8.

The pump is driven by a shaft 14 which passes through a boss 16 in the casing part 6 and which contains a bearing 18 supporting the shaft 14 for rotation. The shaft 14 is surrounded by a seal indicated generally at 20 which aids in preventing leakage of fluids and an additional bearing sleeve 22 helps in sealing and supporting the shaft 14 in the casing 6. At the inner end of the shaft 14 is connected, as by a spline connection 15, a first pump unit or rotor 24, which is cooperatively and drivingly connected with a second pump unit or rotor 26 by a plurality of circumferentially spaced angled sleeves or tubes such as shown at 46 and 48. Both pump units or rotors 24 and 26 rotate within a pumping chamber including first cylindrical chamber 28 and a second cylindrical chamber 30, these chambers being angled with respect to each other and having their axes intersecting at an angle.

The end of the cylindrical chamber 28 is closed by the housing member 6 and the end of the cylindrical chamber 30 is closed by a cover member 32, which is suitably secured to the housing member 8 by one or more fasteners.

The cover member 32 has an intake passageway or pump inlet 34 which communicates with an inlet recess 36 formed in a sealing and porting surface provided to engage the adjoining end surface 26a of the rotor 26. The casing member 6 contains a delivery chamber or pump outlet 38 for receiving the delivery or discharge of the pump and this chamber leads to a passageway 40 which in turn leads to the valve assembly as will be seen in Figure 3.

Each of the two cylindrical rotors 24 and 26 of the pump 12 have formed therein a plurality of circumferentially spaced, longitudinally extending cylindrical openings taking the form of bores 42 and 44. The bores 42 and 44 extend axially with respect to the pump members or rotors 24 and 26 and contain the opposite ends of the sleeves or hollow pistons comprising a plurality of hollow bent tubes, such as are shown at 46 and 48. The interior of the hollow tubes form pump chambers, such as shown at 49 within the tube 46. While only two tubes 46 and 48 are shown, it will be understood that a greater number may be used each having its ends in bored cylinders in the rotors 24 and 26.

As the pump unit 24 is rotated by driving the shaft 14, the tubes or pistons 46 and 48 will drive the lower pump rotor 26 in unison with the rotor 24. Since the cylindrical chambers 28 and 30, in which these pump rotors rotate, are set at an angle with respect to each other, the tubes 46 and 48 will slide within the bores and the effective size of the pump chamber 49 will be progressively increased during 180° of revolution of the pump when the pump is rotating clockwise and the tube moves from the position of the tube 46 to the tube 48. A progressive diminution of the size of the chamber 49 occurs during the other 180° of rotation of the pump when the tube moves from the position of the tube 48 to the position of the tube 46. When the chambers 49 are enlarging, the ends are opposite the inlet recess 36 and when the chambers are diminishing in size, the ends are in communication with the delivery chamber or outlet recess 38, thereby providing the suction and expulsion necessary to pump pressurized fluid out of the pump into the passageway 40.

A spacing plunger or movable pin acts between the pump units 24 and 26 to preload the rotors 24 and 26 against the sealing and porting surfaces and comprises a pin 50 received in a tubular bore 52 formed in one of the rotors engaging against a stationary pin provided by a boss 54 formed on the other pump member. A spring 56 bears against the base of the bore 52 and urges the pin outwardly to provide the necessary continuous bias.

A pressure control chamber 143 is formed between the adjoining end surfaces 24b and 26b at the knee portion of the pump. Pressurized fluid is supplied to the chamber 143 by fluid at pump generated pressure through the normal running clearances of the pump components. The end surfaces 24b and 26b act as motive surfaces and an axially directed thrust is imposed on the rotors 24 and 26 to maintain a proper sealing relation at the porting and sealing surfaces.

The pressurized fluid issuing from the pump and flowing through passageway 40 discharges to a distributing valve shown generally at 58 and controlling the flow of fluid to a first conduit 60 and a second conduit 62.

The distributor valve 58 consists of a cylindrical chamber 64 which contains a valve lining sleeve 66 and the inner surface of this lining 68 will generally be referred to as the cylindrical chamber housing a valve spool or sliding valve member 70. The sliding valve member 70 is generally of hollow cylindrical shape and has a plurality of longitudinally spaced lands and recesses to provide the proper flow passages for its flow control operation.

In the member 8 of the housing which surrounds the cylindrical valve chamber 68, is cut a series of annular grooves 72, 74 and 76. The first annular groove 72 communicates with the pump discharge outlet. The second annular groove 74 communicates with the first conduit 60. The third annular groove 76 communicates with a second conduit 62. The valve liner sleeve 66, which is set into the cylindrical chamber 64 in the casing member 8, has a plurality of circular openings cut in it in register with the annular grooves. Thus, the holes 78 in the sleeve communicate with the groove 72, the holes 80 communicate with the groove 74, and the holes 82 communicate with the groove 76.

The valve plunger or piston 70 has a plurality of openings or recesses which lead from its hollow interior 84 to communicate with the holes 78, 80 or 82 in the sleeve 66 to thus permit the fluid to flow from the passageway 40 to the first and second conduits 60 and 62. The opening in the valve plunger 70 which communicates with the fluid delivery conduit from the pump is numbered 86, as shown in Figure 1. The opening communicating with either the holes 80, leading to the first conduit 60, or with the holes 82, leading to the second conduit 62, is numbered 88. It will be noted from a comparison of Figures 1 and 3, that the holes 86 and 88 are enlarged as at the grooves 90 and 92 in the outer surface of the valve plunger 70, which are of a precise width to afford the necessary communication with the holes in the sleeve 86 dependent on the position of the plunger 70.

The annular groove 92, for example, is of a width so that it can intercommunicate the openings leading both to the first conduit 60 and to the second conduit 62. Sliding movement of the valve plunger 70 will vary the amount of communication between these two holes. The valve, as shown in Figures 1 and 3, is positioned under no load. A coil compression spring 94 preloads the valve spool 70 to the left. As shown in the drawings, at the extreme position of adjustment the entire flow from the pump is directed to the first conduit 60 since the passages 82, 76 to the second conduit 62 are closed by a metering land 83 on the valve spool 70.

Within the hollow valve plunger 70 is a plug 96 seating against a shoulder S formed within the hollow valve plunger. This plug bottoms one end of the coil compression spring 94, the other end of the spring 94 bottoming in the base 98 of a cylindrical chamber 100 formed in the closing plug 102 threaded into the casing member 8. The plug 102 has a hexagonal head 104 for cooperation with an installing tool.

In the first conduit 60 and downstream from the valve 58 there is provided a restriction forming a pressure differential orifice 106. The pressure differential across the orifice 106 is in proportion to the flow of fluid therethrough and is utilized as a controlling variable to control the position of the valve spool 70 as a function of fluid flow. The side 108 of the conduit 60 upstream of the orifice 106 is intersected by a passageway 110 in communication with the chamber 112, which is exposed to the left end 114 of the valve piston 70. The right end 116 of the valve plunger 70 is exposed to the pressure in the conduit 60 in the section 118 downstream of the orifice 106 through a passageway 120a formed in the housing 6 and a passageway 120b formed in the housing part 8 and opening through an aperture 120c formed in the sleeve 66 leading back to the chamber 122, to which the opposite end 116 of the valve plunger 70 is exposed.

Thus with an increasing pump delivery which would cause an increasing flow of fluid through the conduit 60, an increase in flow through the orifice 106 would occur with an increase in pressure drop across the orifice 106. The valve plunger 70 moves to the right in response to the increased pressure differential against the coil compression spring 94 and moves the annular groove 92 into register with the holes 82 thereby supplying fluid to the conduit 62 and decreasing the flow of fluid to the first conduit 60.

A safety device is provided in the event of an excess pressure in the first conduit 60, as might occur with the sticking of the valve plunger 70, or as might occur for other reasons.

Thus if the pressure in the chamber 122 reaches a predetermined maximum level, a ball safety valve 124 will move away from its seat 125 against the bias of control spring 134 and permit the fluid to escape through a passageway 126 formed in the plug 102, through a passageway 128 formed in a ball housing member 130, and out through a passageway 132 extending out of the sides of the housing member 130. These passageways open into the reservoir 145 which is, of course, at atmospheric pressure. This spring 134 is bottomed in the spring chamber 136 against a threaded plug 138 screwed into the bottom of the valve housing 130. If the pressure in the chamber 122 is decreased to unload the valve plunger 70, the plunger will move to an extreme right position, using the orientation of Fig. 3 and the groove 92 formed in the valve spool 70 will open into passageway 82 and conduit 62. Conduit 62 connects the accumulator 189 through check valve 190 and passageway 188.

As shown in Figure 1, the pressure control chamber 143 between the pump rotors 24 and 26 communicates with a passageway 141 leading to openings 139 in the valve sleeve 66. When the plunger 70 moves to the right, chamber 122 behind the plunger is vented, the annular groove 137 in the plunger communicates with the orifices 139 around the sleeve and permits fluid to flow from the pump disabling passageway 141 to the pump venting passageway 147, which leads to the reservoir 145, thereby venting the pressure control chamber 143 and effecting a direct by-pass between the inlet and outlet of the porting and sealing surfaces.

When rated pressure is attained in the accumulator, means are provided for by-passing the delivery of the pump from the second conduit permitting the fluid to escape from the accumulator through an unloading valve 142 including an unloading valve plunger 144 housed within a sleeve 146 set in a cylindrical chamber 148 in the casing member 8. A coil compression spring 154 extends up into the hollow plunger 144 and bottoms on a sealed plug 156 secured in the cylindrical wall 148 of the valve chamber. The plug is sealed by a gasket 158 and locked in place by a split ring 160.

Accumulator pressure is communicated to the chamber 152 in back of the unloading valve by a passageway 162 and a passageway 164. These passageways are regulated by a pilot valve assembly including a pair of interconnected ball valves 166 and 168 which close the ends of a passageway 170 between passageways 162 and 164. Thus, when ball check valve 168 is seated against the end of passageway 170, passageways 162 and 164 are in communication and when ball valve 166 seats, 162 and 164 are separated and passageway 162 is vented. A spacer member 172 is positioned between the check valves 166 and 168 so that only one of them will seat against the end of the passageway 170 at any given time.

In operation, the ball valve 168 is biased toward the end of the passageway 172 by a coil spring 174 acting at one end against a retaining block 176 and bottomed at the other end against a plug 178 threaded into the end of the chamber 180. The other ball 166 is urged in an opposing direction by a coil spring 182, which bears against the ball 166 at one end and which bears against a closure plug 184 threaded into the chamber 186, in which the ball 166 moves.

By proper selection of the coil springs 174 and 182, the ball 168 is held in place against the end of the passageway 170 by the spring 174 thereby communicating accumulator pressure to the chamber 152 and loading the valve 144 closed. When accumulator pressure is increased to a predetermined value the ball 168 will be pushed away from the end of the passageway 170 and ball 166 will be seated against the passageway, thereby venting the passageway 162 and the chamber 152 through chamber 180 and the opening 177 through the plug 178 and unloading the back surfaces of the valve 144.

The pump discharge pressure in chamber 150, bearing against the opposite end of the unloading valve plunger 144, will, therefore, force the plunger to the right, as shown in Figure 3, permitting the fluid in the conduit 62 to flow out through the passageway 140 to the reservoir.

Since the ball check valve 190 is closed and seated against the shoulder of an orifice defining member 192 in the second conduit 62 the accumulator will retain its pressure, but the continued flow of fluid from the pump into the lower end of the second conduit 62 will be by-passed back to the reservoir through the conduit 140.

In summary of the operation of the mechanism, the pump, shown in Figure 1, is driven by rotation of the shaft 14, which rotates the upper and lower cylinder members or rotors 24 and 26 of the pump causing the sleeves 46 and 48 to have relative sliding movement therein. The operating fluid will be taken in through the intake opening 34 and compressed and discharged out through the discharge opening 38 whereby it will flow into the conduit 40, as shown in Figure 3. The fluid then flows into the center of the hollow valve plunger 70 by way of the annular groove 72 in the block 8, the holes 78 in the sleeve 66, the annular channel 90 in the valve plunger, and the openings 86 in the valve plunger. Fluid then passes through the hollow center 84 of the valve and is directed through the opening 88 and into the annular channel 92 extending around the valve plunger 70. The position of the valve plunger will determine the manner in which the annular channel 92 of the movable valve plunger covers the orifices 80 and 82, which lead to the first conduit 60 and the second conduit 62. Movement of the valve plunger 70 in response to the flow requirements, therefore, will determine the distribution of the fluid, the position of the valve being influenced by the coil compression spring 94, which bears on one end against the pressure in chamber 112 which is referenced to the pressure in the first conduit 60, and by the downstream pressure of the orifice 106 in the first conduit which is led to the opposite side by the valve plunger through the passageway 120 and into the chamber 122.

Thus, the valve is positioned in accordance with the pressure differential across the orifice 106 in the first conduit 60.

If an excessive pressure builds up in the downstream side 118 of the first conduit 60, this excess pressure will unseat the ball valve 124 thereby venting fluid through the passageways 126 and 128 from the chamber 122 and unloading the valve plunger whereby the plunger is moved to an extreme end position with groove 92 in communication with passage 62. The chamber 143 of the pump is simultaneously vented through passageway 141, holes 139, annular groove 137, and passageways 147, thereby effecting a direct by-pass at the sealing and porting surfaces of the pump.

If pressure builds up in the accumulator, the ball valve 168 is opened, and the ball valve 166 is moved against the end of the passageway 170, thereby venting the passageway 162 and reducing the pressure in the chamber 152 behind the unloading valve plunger 144. The fluid in chamber 152 will vent through passageway 162 and flow out through chamber 180 and vent opening 177.

The plunger 144 will then move to the right, as shown in Figure 3, to connect the second conduit 62 through the passageway 140 which leads back to the reservoir. The check valve 190 will prevent the accumulated fluid in the accumulator from flowing back through the relief passageway 140.

When the pressure in the accumulator drops below a predetermined level, the ball check valve 166 will unseat and the valve 168 will again seat. This will communicate accumulator pressure back through passageway 162 to the chamber 152 whereupon the relief valve plunger 144 moves to its closed position and flow from the pump will be available for recharging the accumulator.

Thus, it will be seen that I have provided an improved fluid flow distributing system and method which meets the objectives and advantages hereinbefore set forth. The apparatus is capable of reliably feeding a supply of fluid to operating devices operable on an open center control in combination with operating devices operable on a closed center control.

I have, in the drawings and specification, presented a detailed disclosure of the preferred embodiment of my invention, but it is to be understood that I do not intend to limit the invention to the specific form disclosed, but intend to cover all modifications, changes and alternative constructions and methods falling within the scope of the principles taught by my invention.

I claim as my invention:

1. A combined pump and flow control device comprising, means forming a hydraulic circuit and including pumping means at one point in said circuit to drive a stream through said circuit at increased pressure, flow-responsive metering means at a second point in said circuit for metering at least a portion of said stream as a function of a predetermined flow requirement and directing the remainder of said stream to a third point in said circuit, pressure accumulator means in said circuit at said third point for accumulating fluid at a predetermined value of pressure to maintain a minimum head, and pressure-responsive by-pass means between said third point of said circuit and said one point of said circuit comprising a by-pass passage, a by-pass valve closing said passage, a spring urging said by-pass valve to closed position, said by-pass valve including a first motive surface opposed to said spring and subject to pressure generated by said pumping means, said by-pass valve having a second motive surface oppositely disposed with respect to said first motive surface, means forming a passage between said pressure accumulator means and said second motive surface, an open-ended valve recess intersecting said passage between said accumulator means and said second motive surface, said open-ended valve recess subject at one end to the pressure in said accumulator means and subject at the other end to a reduced pressure in a zone of reduced pressure, a dumbbell valve in said valve recess having longitudinally spaced apart head portions for selectively closing said opposite ends of said valve recess, springs at opposite ends of said dumbbell valve unbalanced in direction with respect to one another to load said dumbbell valve with said other end closed and with said passage in communication with said pressure accumulator means, thereby loading said by-pass valve closed and closing said by-pass passage, said dumbbell valve moving in response to increased pressure in said accumulator means to close said one end of said valve recess and to open said other end of said valve recess for venting said second motive surface to the zone of reduced pressure, thereby unloading said by-pass valve, whereupon said by-pass valve will open as a function of a predetermined pressure in said accumulator means.

2. A combined pump and flow control device as defined in claim 1, and a check valve at the inlet of said accumulator means to prevent the escape of pressurized fluid therefrom.

3. A combined pump and valve assembly comprising housing having an inlet and an outlet, rotary fluid displacement means for directing a stream of liquid from said inlet to said outlet and a valve assembly in said outlet comprising means forming a cylindrical recess having axially spaced lands and recesses including a first and a second recess, a hollow valve spool slidable in said cylindrical recess and having axially spaced peripheral openings and lands, first passage means in said housing communicating with said first recess to carry pressurized fluid admitted thereto by said valve spool to a first point of utilization, second passage means in said housing communicating with said second recess means to carry pressurized fluid admitted thereto by said valve spool to a second point of utilization, a flow restrictor in said first passage means, said valve spool having spaced pressure motive surfaces subject to pressures on opposite sides of said flow restrictor to move said valve spool as a function of the flow through said first passage means, biasing means urging said valve spool to a first position wherein all of the fluid from said outlet is directed to said first passage means, and being yieldable when said valve spool is adjusted toward a second position wherein at least part of the fluid from said outlet is directed to said second passage means, a by-pass in said second passage means to said inlet, and a valve for closing said by-pass, said valve having a first motive surface subject to the pressures in said second passage and a second motive surface subject to pressure at the second point of utilization, a spring preloading said second motive surface to urge said valve closed, and pressure-responsive means to temporarily unload said second motive surface in response to a predetermined change of pressure at the second point of utilization, whereby fluid is selectively directed to said second point of utilization as a function of the flow requirements in said first passage and is selectively by-passed from said second passage as a function of the pressure at the second point of utilization.

4. In a hydraulic system comprising an open center accessory unit, a closed center accessory unit, and a common pump and valve assembly for said units comprising a housing having an inlet and an outlet, rotary fluid displacement means for moving fluid from said inlet to said outlet at increased pressure, a spool valve in said outlet, means forming a first and a second passageway to each respective accessory unit from said outlet and controlled by said spool valve, a flow restrictor in said first passageway to said open center accessory unit, means forming passageways in said housing communicating pressure on opposite sides of said flow restrictor to opposite sides of said spool valve to control the adjustable positioning of said spool valve as a function of the flow through said first passageway, whereby the first passageway is supplied with a regulated supply of fluid and the remainder of the fluid is directed to said second passageway, accumulator means in said second passageway to accumulate fluid at a predetermined head of pressure, means forming a by-pass between said second passage and said inlet, and pressure-responsive valve means controlling said by-pass as a function of accumulator pressure, said pressure-responsive valve means comprising a by-pass valve closing said by-pass between said second passage and said inlet, a spring urging said by-pass valve to closed position, said by-pass valve including a first motive surface opposed to said spring and subject to the pump-generated pressure in said second passage, said by-pass valve having a second motive surface oppositely disposed with respect to said first motive surface, means forming a control passage between said accumulator means and said second motive surface, an open-ended valve recess intersecting said control passage and being subject at one end to the pressure in said accumulator means and being subject at the other end to a reduced pressure in a zone of reduced pressure, a dumbbell valve in said valve recess having spaced apart head portions to selectively close the respective ends of said valve recess, springs at opposite ends of said dumbbell valve unbalanced in direction with respect to one another to load said dumbbell valve with said other end closed and said control passage in communication with said accumulator means, thereby loading said by-pass valve closed, said dumbbell valve moving in response to increased pressure in said accumulator means to close said one end of said valve recess and to open said other end of said valve recess for venting said control passage and said second motive surface to said zone of reduced pressure, thereby unloading said by-pass valve, whereupon said by-pass valve will open as a function of a predetermined pressure in said accumulator means.

5. A combined pump and flow control device comprising, means forming a hydraulic circuit and including pumping means for continuous operation having an intake and a discharge and positioned at one point in said circuit to drive a stream through said circuit at increased pressure, a first conduit means leading from said one point to a second point in the circuit, a second conduit means leading from said one point to a third point in the circuit, said first and second conduits joined at said first point, a metering means variable in response to flow in said first conduit at said second point in said circuit for metering at least a portion of said stream as a function of a predetermined flow requirement whereby the portion of the stream which does not flow through said first conduit means will flow through said second conduit means, means at the third point of said circuit receiving the remainder of said stream, pressure-responsive by-pass means from said hydraulic circuit in said second conduit means between said third point and said one point in said circuit and being operable as a function of a predetermined value of pressure, said by-pass means leading back to said pump intake, and a check valve automatically closed by reverse flow connected between said third point and said pressure responsive by-pass means to prevent reverse flow from the third point to said by-pass means.

6. A combined pump and flow control device comprising, means forming a hydraulic circuit and including pumping means for continuous operation having an inlet and a discharge at one point in said circuit to drive a stream through said circuit at increased pressure, a first conduit means between said one point and a second point in said circuit, a second conduit means joined to said first conduit means at said one point and leading to a third in the first conduit means at the second point in said point, a metering means variable in response to flow circuit for metering at least a portion of said stream as a function of a predetermined flow requirement, means at the third point in said circuit receiving the remainder of said stream, said means at said third point in said circuit comprising a pressure accumulator, pressure-responsive by-pass means between said third point of said circuit and said one point of said circuit operable as a function of a predetermined pressure in said accumulator, said by-pass means connected to deliver the by-passed portion of the stream back to the pump inlet, and a return flow preventing check valve automatically closed by reverse flow connected between said third point and said pressure responsive by-pass means to prevent reverse flow from the third point to said by-pass means.

7. A hydraulic system comprising a first flow conduit means for leading to an accessory unit requiring a continuing supply of fluid, a second flow conduit means for leading to a fluid storage unit to supply intermittent flow for intermittent requirements of an accessory, fluid supply means connected to said conduits for providing a continuing flow of fluid, a flow control valve connected to said first and second conduit means and dividing flow therebetween, valve operating means connected to said first conduit means to be responsive to fluid flow in said first conduit means and to vary the opening of said control valve as a function of flow in said first conduit means to maintain a flow through said first conduit means whereby the flow requirements of said first conduit means are first met and the remainder of fluid is directed through said second conduit means, a pressure relief passage leading from said second conduit means, a pressure relief valve in said relief passage whereby fluid in excess of the requirements of both said first and second conduits may be discharged and a check valve automatically closed by reverse flow between said fluid storage unit and said pressure relief passage and being connected in said second conduit downstream of said pressure relief passage to be between the pressure relief passage and the fluid storage unit.

8. A hydraulic system comprising a first flow conduit means for leading to an accessory unit requiring a continuing supply of fluid, a second flow conduit means for leading to a fluid storage unit to supply intermittent flow for the intermittent requirement of an accessory, fluid supply means for providing a continuing flow of fluid in varying quantities, a flow control valve connected to said first and second conduit means and dividing flow therebetween, a pressure drop orifice means in said first conduit means for measuring the flow therethrough as a function of variance in supply means output, a valve operating means connected across said orifice to be responsive to pressure drop thereacross and connected to said control valve to position the control valve as a function of decreased flow through said first conduit means and decreased pressure drop across said orifice to increase the valve opening to said first conduit means and decrease the valve opening to said second conduit means, and moving control valve as a function of increased pressure drop to respectively decrease and increase the openings to said first and second conduit means, a pressure relief valve in said second conduit means a pressure responsive valve operator connected to said relief valve and to said second conduit means downstream of the pressure relief valve whereby supply fluid in excess of the requirements of both said first and second conduits may be discharged, and a check valve automatically closed in response to reverse flow positioned downstream of the point of connection of said pressure relief valve and said second conduit to prevent return flow with opening of said relief valve.

9. A combined pump and flow control device comprising, means forming a hydraulic circuit and including pumping means at one point in said circuit to drive a stream through said circuit, a metering means variable in response to flow at a second point in said circuit for metering at least a portion of said stream as a function of a predetermined flow requirement, means at a third point in said circuit comprising a pressure accumulator connected to receive the remainder of said stream, a check valve between said first and third points automatically closing with reverse flow from said third point preventing flow from the pressure accumulator toward the first point a relief valve between said check valve and said first point to permit the discharge of excess fluid from the pumping means, and a pressure-responsive valve operator connected to operate said relief valve and connected to said circuit between said check valve and said third point to open said relief valve at a predetermined pressure at said third point and relieve pressure at said relief valve whereby fluid will not flow from the accumulator as the valve opens.

10. A hydraulic system comprising a first flow conduit means for leading to an accessory unit requiring a continuing supply of fluid, a second flow conduit means for leading to a fluid storage unit to supply intermittent flow for intermittent requirements of an accessory, fluid supply means connected to said conduits for providing a continuing flow of fluid, a flow control valve connected to said first and second conduit means and dividing flow therebetween, valve operating means connected to said first conduit means to be responsive to fluid flow in said first conduit means and to vary the opening of said control valve as a function of flow in said first conduit means to maintain a flow through said first conduit means whereby the flow requirements of said first conduit means are first met and the remainder of fluid is directed through said second conduit means, a pressure relief passage leading from said second conduit means, a pressure relief valve in said relief passage whereby fluid in excess of the requirements of both said first and second conduits may be discharged, and a pressure responsive valve operator connected to said first conduit means to be responsive to pressure therein and connected to said control valve moving the valve to direct all of the fluid flow to said second conduit means when a predetermined maximum pressure is reached in said first conduit means.

References Cited in the file of this patent

UNITED STATES PATENTS

| | | |
|---|---|---|
| 1,063,143 | Vincent | May 27, 1913 |
| 1,247,544 | Kimes | Nov. 20, 1917 |
| 1,315,680 | Nordberg | Sept. 9, 1919 |
| 1,490,179 | Morrow | Apr. 15, 1924 |
| 1,760,636 | Fortune et al. | May 27, 1930 |
| 1,996,889 | Thomas | Apr. 9, 1935 |
| 2,284,110 | Vickers | May 26, 1942 |
| 2,312,417 | Jones | Mar. 2, 1943 |
| 2,364,301 | MacNeil | Dec. 5, 1944 |
| 2,571,871 | Hayes | Oct. 16, 1951 |
| 2,588,261 | Magdeburger | Mar. 4, 1952 |
| 2,799,995 | Herman | July 23, 1957 |
| 2,818,711 | Lincoln et al. | Jan. 7, 1958 |
| 2,846,850 | Hall | Aug. 12, 1958 |
| 2,859,762 | Banker | Nov. 11, 1958 |

FOREIGN PATENTS

| | | |
|---|---|---|
| 559,485 | Germany | Sept. 20, 1932 |
| 1,084,459 | France | July 7, 1954 |